United States Patent
Spangler et al.

(10) Patent No.: US 10,612,390 B2
(45) Date of Patent: Apr. 7, 2020

(54) TRAILING EDGE PRESSURE AND FLOW REGULATOR

(71) Applicant: UNITED TECHNOLOGIES CORPORATION, Farmington, CT (US)

(72) Inventors: Brandon W. Spangler, Vernon, CT (US); Carey Clum, East Hartford, CT (US); Matthew A. Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 432 days.

(21) Appl. No.: 15/416,394

(22) Filed: Jan. 26, 2017

(65) Prior Publication Data

US 2018/0209286 A1     Jul. 26, 2018

(51) Int. Cl.
    *F01D 5/18*    (2006.01)
    *F01D 9/06*    (2006.01)
    *F02C 7/18*    (2006.01)

(52) U.S. Cl.
    CPC .............. *F01D 5/186* (2013.01); *F01D 5/189* (2013.01); *F01D 9/065* (2013.01); *F02C 7/18* (2013.01); *F05D 2240/122* (2013.01); *F05D 2260/20* (2013.01); *F05D 2260/202* (2013.01); *F05D 2260/2212* (2013.01); *Y02T 50/676* (2013.01)

(58) Field of Classification Search
    CPC .................................. F01D 5/188; F02C 7/125
    See application file for complete search history.

(56) References Cited

U.S. PATENT DOCUMENTS

| | | | |
|---|---|---|---|
| 5,243,759 A | 9/1993 | Brown et al. | |
| 5,772,397 A | 6/1998 | Morris et al. | |
| 6,132,169 A | 10/2000 | Manning et al. | |

(Continued)

FOREIGN PATENT DOCUMENTS

| | | |
|---|---|---|
| FR | 2924156 | 5/2009 |
| GB | 1350424 | 4/1974 |
| GB | 1516757 | 7/1978 |

OTHER PUBLICATIONS

Extended European Search Report for European Application No. 18153750.7, dated Oct. 11, 2018.

*Primary Examiner* — Bryan M Lettman
*Assistant Examiner* — Timothy P Solak
(74) *Attorney, Agent, or Firm* — Carlson, Gaskey & Olds, P.C.

(57) ABSTRACT

A gas turbine engine component comprises a body having a leading edge, a trailing edge, and a radial span. One internal channel in the body provides an upstream supply pressure. Another internal channel in body receives the upstream supply pressure and provides a downstream supply pressure. At least one axial rib separates an internal area adjacent to the trailing edge into a plurality of individual cavities. At least one pressure regulating feature is located at an entrance to at least one individual cavity entrance to control downstream supply pressure to the trailing edge. Exits formed in the trailing edge communicate with an exit pressure. The rib and pressure regulating features cooperate such that the downstream supply pressure mimics the exit pressure along the radial span. A method of manufacturing a gas turbine engine component and a method of controlling flow in a gas turbine engine component are also disclosed.

20 Claims, 7 Drawing Sheets

(56) References Cited

U.S. PATENT DOCUMENTS

| | | | |
|---|---|---|---|
| 6,602,047 B1 * | 8/2003 | Barreto | F01D 5/187 415/1 |
| 7,121,787 B2 * | 10/2006 | Jacks | F01D 5/186 415/115 |
| 7,625,180 B1 * | 12/2009 | Liang | F01D 5/186 29/889.2 |
| 7,753,650 B1 * | 7/2010 | Liang | F01D 5/187 416/97 R |
| 7,806,659 B1 | 10/2010 | Liang | |
| 8,057,183 B1 | 11/2011 | Liang | |
| 8,613,597 B1 | 12/2013 | Liang | |
| 2008/0279696 A1 | 11/2008 | Liang | |
| 2014/0064983 A1 | 3/2014 | Jones et al. | |
| 2014/0093379 A1 * | 4/2014 | Tibbott | F01D 5/189 416/224 |
| 2017/0306765 A1 | 10/2017 | Walunj et al. | |

* cited by examiner

TRAILING EDGE PRESSURE AND FLOW REGULATOR

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND OF THE INVENTION

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. A turbine section typically includes multiple stages of vanes and rotor blades use to extract a maximum amount of energy from the combustion flow. The efficiency of the engine is impacted by ensuring that the products of combustion pass in as high a percentage as possible across the turbine blades.

With each new engine design, gas temperatures increase and cooling flow requirements decrease. This requires cooling flow to be utilized in a more efficient manner and flow distribution to be tailored to prevent overcooling in certain regions. A radial variation in gaspath pressure at a trailing edge of an airfoil can result in excess cooling flow for current trailing edge configurations. The supply pressure for trailing edge slots is set such that a backflow margin (pressure ratio across the slots) meets minimum requirements. This supply pressure is relatively constant for all of the trailing edge slots, while the gaspath exit pressure can vary radially, resulting in some slots with higher backflow margins. Since the trailing edge slot sizes are determined by manufacturing requirements, this results in some slots having higher cooling flows.

SUMMARY OF THE INVENTION

In a featured embodiment, a gas turbine engine component comprises a body having a leading edge extending to a trailing edge, and extending from a radially inner end to a radially outer end to define a radial span. A first internal channel is formed within the body to provide an upstream supply pressure. A second internal channel formed within the body receives the upstream supply pressure and provides a downstream supply pressure. At least one axial rib separates an internal area adjacent to the trailing edge into a plurality of individual cavities. At least one pressure regulating feature is located at an entrance to at least one individual cavity to control the downstream supply pressure to the trailing edge. A plurality of exits formed in the trailing edge communicates with an exit pressure. At least one axial rib and pressure regulating features cooperate with each other such that the downstream supply pressure mimics the exit pressure along the radial span.

In another embodiment according to the previous embodiment, the at least one pressure regulating feature comprises a plurality of pressure regulating features.

In another embodiment according to any of the previous embodiments, the at least one pressure regulating feature comprises one or more crossover holes.

In another embodiment according to any of the previous embodiments, the at least one pressure regulating feature comprises one or more pedestals.

In another embodiment according to any of the previous embodiments, the at least one axial rib comprises a plurality of axial ribs.

In another embodiment according to any of the previous embodiments, a radial wall is included that forms a fore wall of at least one of the individual cavities.

In another embodiment according to any of the previous embodiments, the at least one pressure regulating feature is formed in the radial wall.

In another embodiment according to any of the previous embodiments, each cavity with a radial wall includes a plurality of pressure regulating features in the radial wall.

In another embodiment according to any of the previous embodiments, the pressure regulating features comprise any combination of round and/or oblong holes.

In another embodiment according to any of the previous embodiments, a second radial wall positioned in at least one of the individual cavities downstream of the radial wall, and wherein the second radial wall includes at least one pressure regulating feature.

In another embodiment according to any of the previous embodiments, a plurality of pedestals spaced apart from each other along the radial span form the entrance to the individual cavities and to provide the pressure regulating features.

In another embodiment according to any of the previous embodiments, the pressure regulating features comprise any combination of round and/or oblong pedestals.

In another embodiment according to any of the previous embodiments, a second set of pedestals is positioned in at least one of the individual cavities downstream of the plurality of pedestals. The second set of pedestals cooperates with the plurality of pedestals to further define the pressure regulating features.

In another embodiment according to any of the previous embodiments, the pressure regulating features are formed in a baffle positioned within the second internal channel.

In another featured embodiment, a gas turbine engine comprises a compressor section defining an engine center axis, a combustor section downstream of the compressor section, and a turbine section downstream of the combustor section. The turbine section includes a turbine component having a leading edge extending to a trailing edge, and extending from a radially inner end to a radially outer end to define a radial span. A first internal channel is formed within the turbine component to provide an upstream supply pressure. A second internal channel is formed within the turbine component that receives the upstream supply pressure and provides a downstream supply pressure. At least one axial rib separates an internal area adjacent to the trailing edge into a plurality of individual cavities. At least one pressure regulating feature is located at an entrance to at least one individual cavity to control the downstream supply pressure to the trailing edge. A plurality of exits is formed in the trailing edge that communicate with an exit pressure. The at least one axial rib and pressure regulating features cooperate with each other such that the downstream supply pressure mimics the exit pressure along the radial span.

In another embodiment according to the previous embodiment, the at least one pressure regulating feature comprises one or more crossover holes and/or one or more pedestals.

In another embodiment according to any of the previous embodiments, the at least one axial rib is a plurality of axial ribs that are radially spaced apart from each other along the trailing edge.

In another embodiment according to any of the previous embodiments, a method of manufacturing a gas turbine engine component comprises providing a body a having a leading edge extending to a trailing edge and extending from a radially inner end to a radially outer end to define a radial span. A first internal channel is formed within the body to provide an upstream supply pressure. A second internal channel is formed within the body to receive the upstream supply pressure and provide a downstream supply pressure. At least one axial rib is formed that separates an internal area adjacent to the trailing edge into a plurality of individual cavities. At least one pressure regulating feature is formed at an entrance to each cavity to control the downstream supply pressure to the trailing edge. A plurality of exits is formed in the trailing edge to communicate with an exit pressure. The at least one axial rib and pressure regulating features cooperate with each other such that the downstream supply pressure mimics the exit pressure along the radial span.

In another embodiment according to the previous embodiment, at least two individual cavities are formed that are radially spaced apart from each other along the trailing edge, and forming the at least one pressure regulating feature as one or more crossover holes and/or one or more pedestals at the entrance to each cavity to manage the downstream supply pressure to the exits such that each exit has a minimum backflow margin.

In another embodiment according to any of the previous embodiments, a method of controlling flow in a gas turbine engine component comprises providing a body a having a leading edge extending to a trailing edge and extending from a radially inner end to a radially outer end to define a radial span. A first internal channel is formed within the body to provide an upstream supply pressure. A second internal channel is formed within the body to receive the upstream supply pressure and provide a downstream supply pressure. A plurality of exits is formed in the trailing edge that communicate with an exit pressure. Cooling flow is tailored along the radial span to minimize cooling flow to the trailing edge by regulating a pressure ratio across each of the exits such that a minimum backflow margin is maintained along the radial span.

The foregoing features and elements may be combined in any combination without exclusivity, unless expressly indicated otherwise.

These and other features may be best understood from the following drawings and specification.

DETAILED DESCRIPTION

Figure 1:
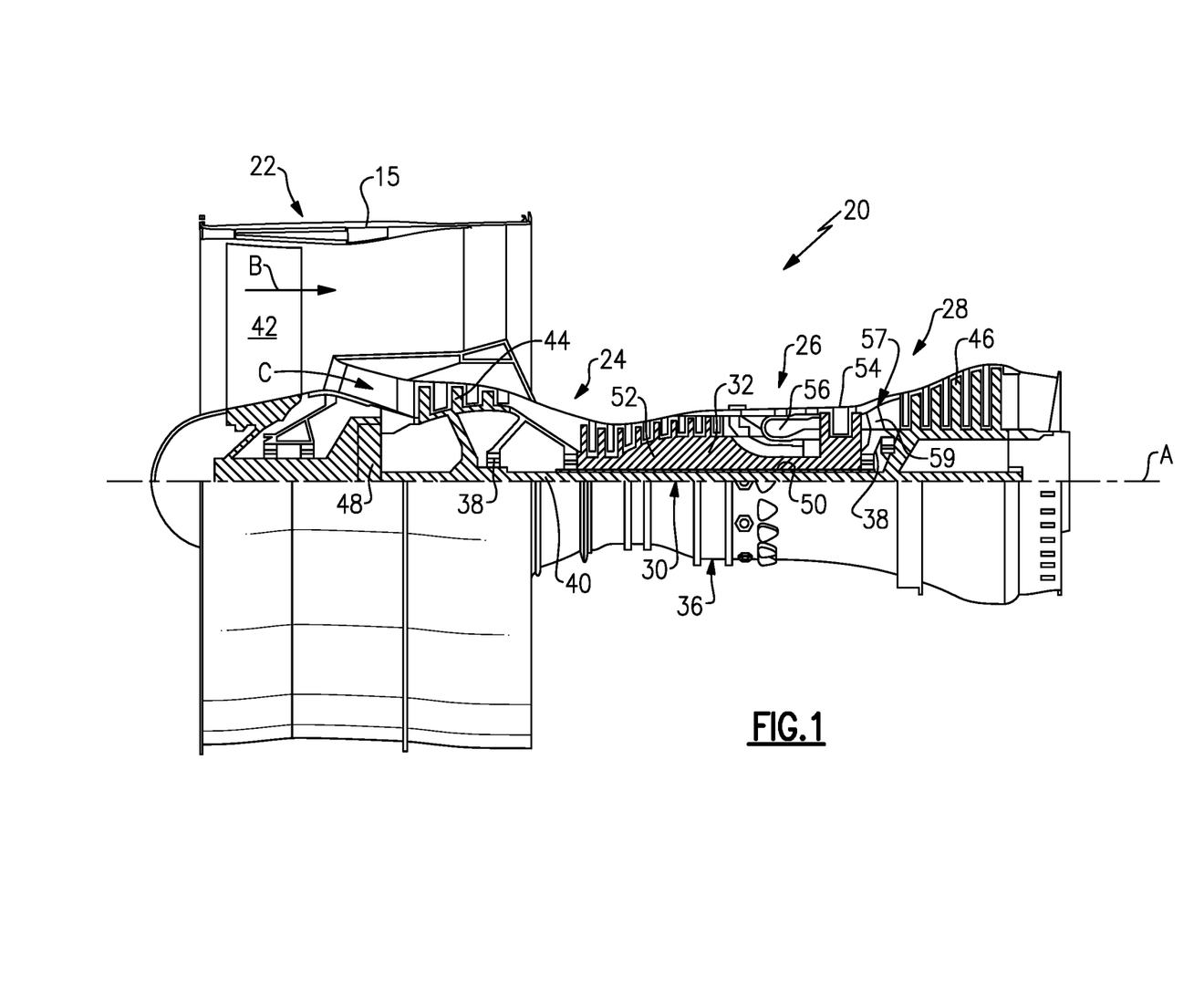
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

Figure 2:
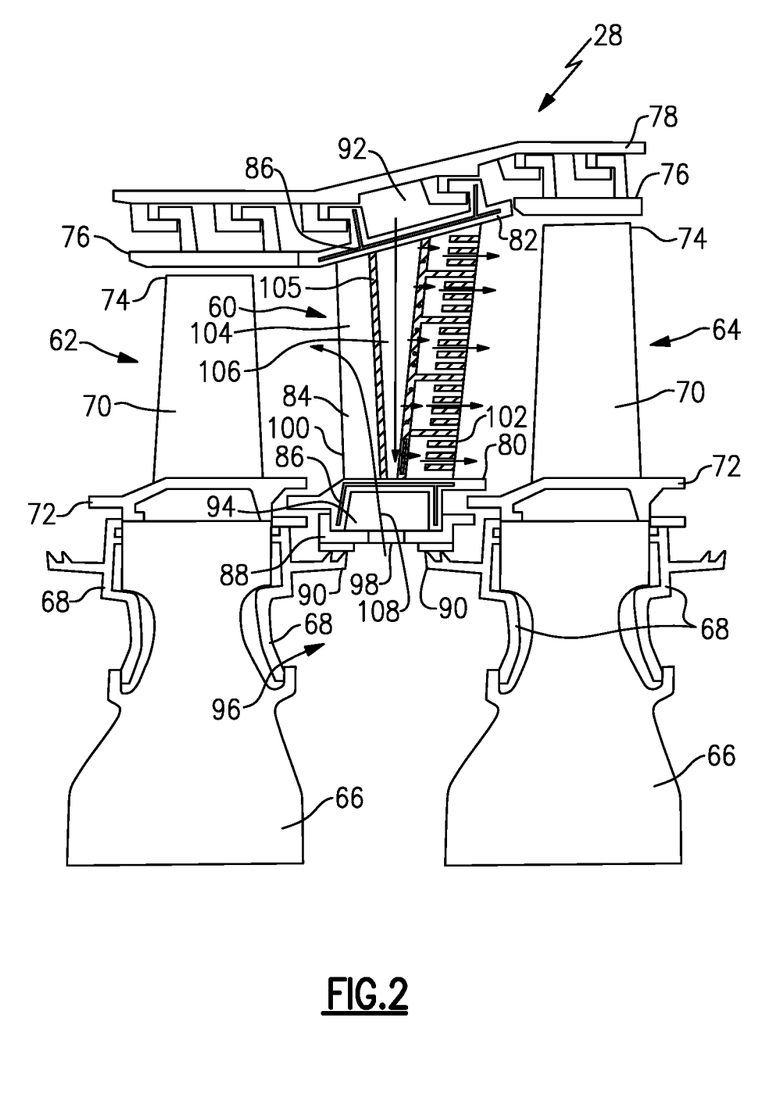
FIG. 2 is a schematic view of blades and a vane that incorporates the subject invention.

FIG. 2 shows a vane 60 positioned between a first blade 62 and a second blade 64 in the turbine section 28. In one example, the blades 62, 64 are attached to a full hoop disk 66 with fore and aft coverplates 68. The disks 66 are driven by a turbine rotor about the engine center axis A. Airfoil bodies 70 extend from a radially inner platform 72 of blades 62, 64 to a tip 74. Blade outer air seals (BOAS) 76 are mounted to a radially outer full hoop case 78 and are spaced from the tips 74 by a small clearance gap as known.

The vane 60 includes a radially inner platform 80, a radially outward platform 82, and an airfoil body 84 extending between the radially inner platform 80 and radially outer platform 82. The vane 60 is coupled to the full hoop case 78 at the radially outer platform 82 and includes feather seals 86 between vane segments at the radially inner platform 80 and radially outer platform 82. A full hoop inner air seal 88 is coupled to the radially inner platform 80 and cooperates with seals 90 on the coverplates 68 of the blades 62, 64.

Between the full hoop case 78 and the radially outer platform 82 is a vane outer diameter cavity 92, and between the radially inner platform 80 and the inner air seal 88 is a vane inner diameter cavity 94. Radially inward of the inner air seal 88 and between the disks 66 is a rotor cavity 96. One or more orifices 98 are formed in the inner air seal 88 to direct flow into the vane inner diameter cavity 94. Cooling flow is also directed into the vane outer diameter cavity 92 as known.

The airfoil body 84 of the vane 60 extends from a leading edge 100 to a trailing edge 102. A first internal channel 104 is formed in the body 84 at the leading edge 100 and a second internal channel 106 is formed centrally in the body 84 downstream from the first internal channel 104. A radial wall 105 separates the first internal channel 104 from the second internal channel 106. In the example shown in FIG. 3A, the air flow from the vane inner diameter cavity 94 is directed into the first internal channel 104 and is directed out from the airfoil body 84 via the leading edge 100 as indicated by arrow 108 to provide leading edge flow. The air from the vane outer diameter cavity 92 is directed into the second internal channel 106 and leaves the channel 106 via trailing edge exits. In the example shown, the exits comprise slots 110 as indicated by arrows 112; however, the exits could also comprise drilled holes.

Figure 3A:
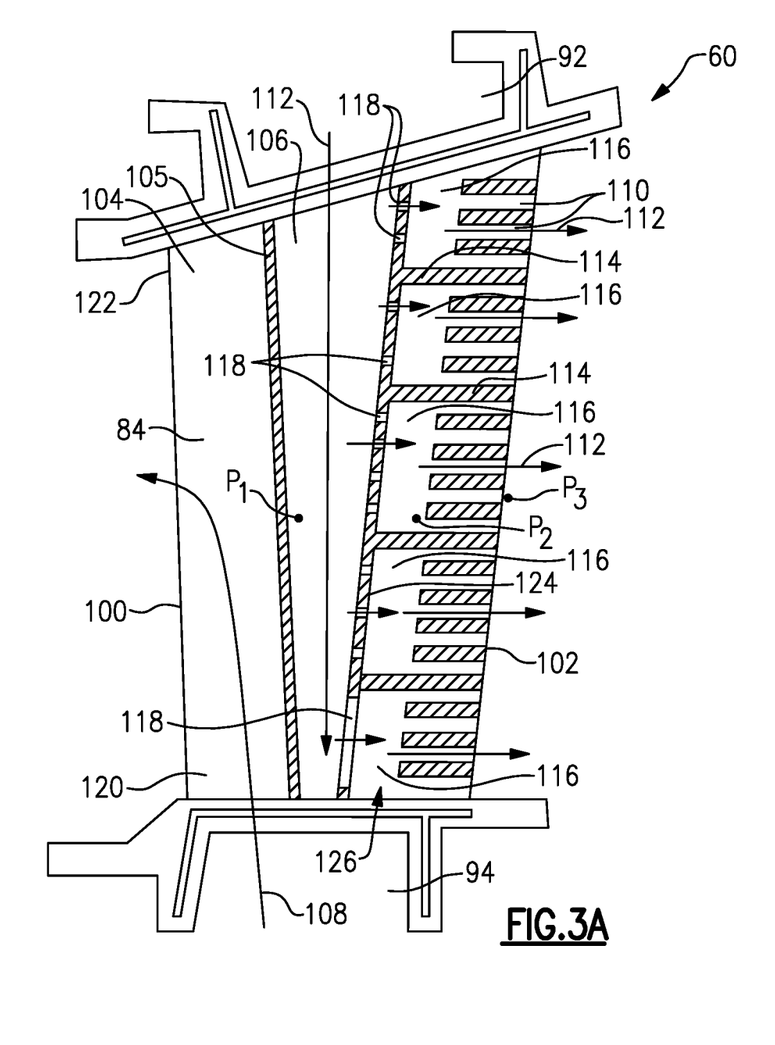
FIG. 3A is a schematic view of a vane from FIG. 2 incorporating the subject invention.

With each new engine design, gas temperatures increase and cooling flow requirements decrease. This requires cooling flow to be utilized in a more efficient manner and flow distribution to be tailored to prevent overcooling in certain regions. A radial variation in gaspath pressure at the trailing edge 102 of the airfoil body 84 can result in excess cooling flow. The supply pressure for trailing edge slots 110 is set such that a backflow margin (BFM), i.e. a pressure ratio across the slots 110, meets minimum requirements. This supply pressure is relatively constant for all of the trailing edge slots 110, while the gaspath exit pressure can vary radially, resulting in some slots 110 having higher backflow margins. Since the trailing edge slot sizes are determined by manufacturing requirements, this results in some slots having higher cooling flows.

The subject invention provides one or more axial ribs 114 to radially separate an internal area 126 adjacent to the trailing edge 102 into a plurality of individual plenums or cavities 116. Pressure regulating features 118 are located at the entrance to these cavities 116 and are tailored to manage the supply pressure to the trailing edge slots 110 such that each trailing edge slot 110 has the minimum backflow margin, thereby reducing the cooling flow levels. By using the axial ribs 114 in combination with the pressure regulating features 118, the downstream supply pressure mimics the exit pressure along the radial span of the airfoil body 84. These pressure regulating features can be crossover holes or pedestals with varying shapes and sizes. This will be discussed in greater detail below.

Figure 4A:
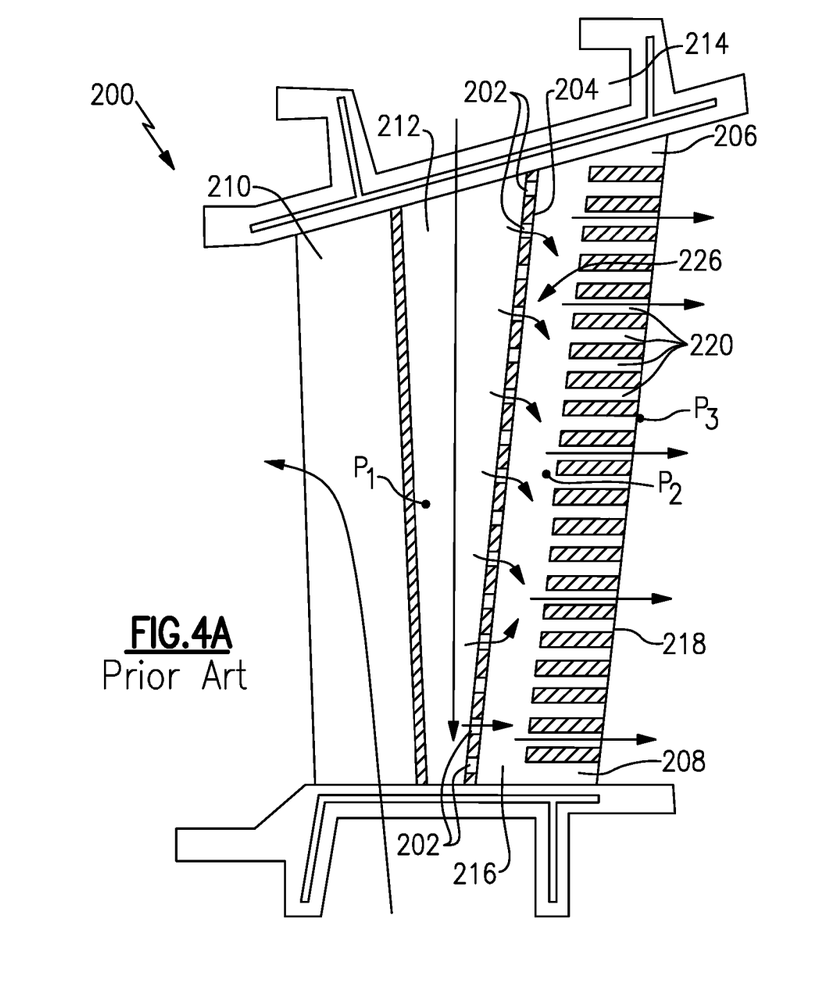
FIG. 4A is a schematic view of a vane incorporating a crossover hole configuration from the prior art.
Figure 4B:
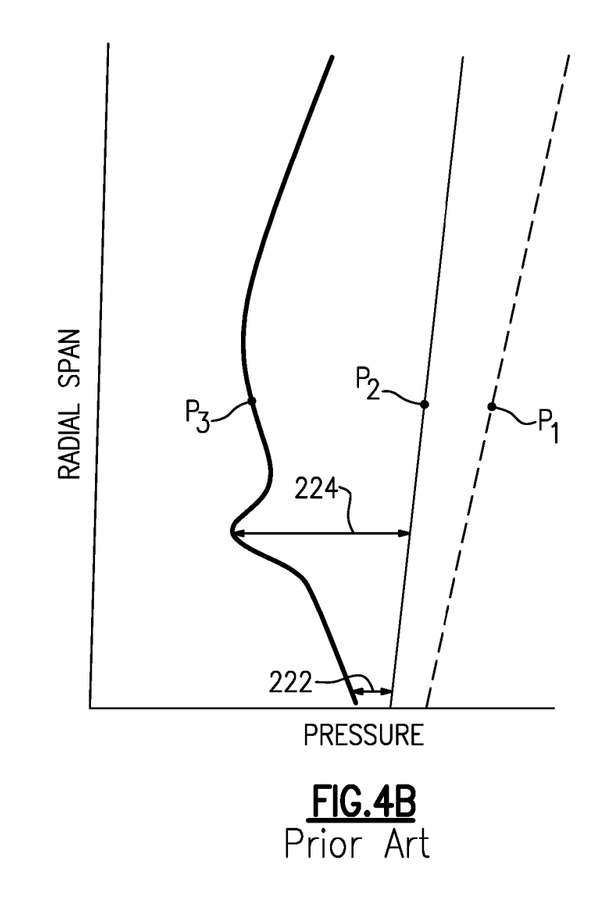
FIG. 4B is a graph representing radial span versus pressure for the vane of FIG. 4A.

In one known configuration shown in FIGS. 4A-4B, a vane 200 includes crossover holes 202 that are formed in a radial rib 204 that extends from a radially outer end 206 of the vane 200 to a radially inner end 208 of the vane 200. Leading edge flow is provided through a first internal cavity 210 as described above. Flow enters the second internal cavity 212 from a vane outer diameter cavity 214 and flows into a third internal cavity 216 adjacent to a trailing edge 218 via the crossover holes 202. The third internal cavity 216 comprises a single cavity extending from the radially outer end 206 of the vane 200 to the radially inner end 208 of the vane 200.

The second internal cavity 212 has a supply pressure P1. Frictional loses cause this upstream supply pressure P1 to reduce as flow travels through the cavity 212. The third internal cavity 216 has a downstream supply pressure P2. The crossover holes 202 reduce the downstream supply pressure P2 to the minimum BFM requirement at one radial span. The flow is allowed to migrate radially, as shown at 226, in the downstream cavity 216, resulting in the downstream supply pressure P2 rebalancing radially.

The flow exits trailing edge slots 220 at an exit pressure P3. The minimum trailing edge slot area is determined by manufacturing requirements for the casting process. The flow is determined by the BFM across the slots 220 and by the trailing edge slot area. BFMs that are higher than the minimum requirements result in excess flow.

As known, a casting process uses a core to form open internal areas within a component. The core is positioned in a die and material is supplied to the die to flow around the core to cast the component. Once the component is cast the core is removed to provide the open areas within the component. As known, the casting process requires a certain core area to make sure the core remains intact during the process. For a cast airfoil body, the trailing edge includes a plurality of slots that extend from the inner diameter to the outer diameter. The slots are formed to be at the minimum size that is required to prevent core break during the casting process. Further, the structure on the core that is used to form the slots helps position the core during the casting process. The resulting component includes cast slots for the entire radial span which results in excess cooling flow.

FIG. 4B shows the radial span versus pressure for the crossover configuration shown in FIG. 4A. The upstream supply pressure P1 is fixed along the radial span. As discussed above, the downstream supply pressure P2 is less than P1 due to frictional losses. The exit pressure P3 is also fixed and is determined by the external shape of the airfoil body. The lowest BFM (see 222) must meet the minimum requirement, setting the downstream supply pressure P2 and resultant flow. As indicated at 224, the BFM is higher than the minimum requirement which results in excess flow at this radial span location.

Figure 5A:
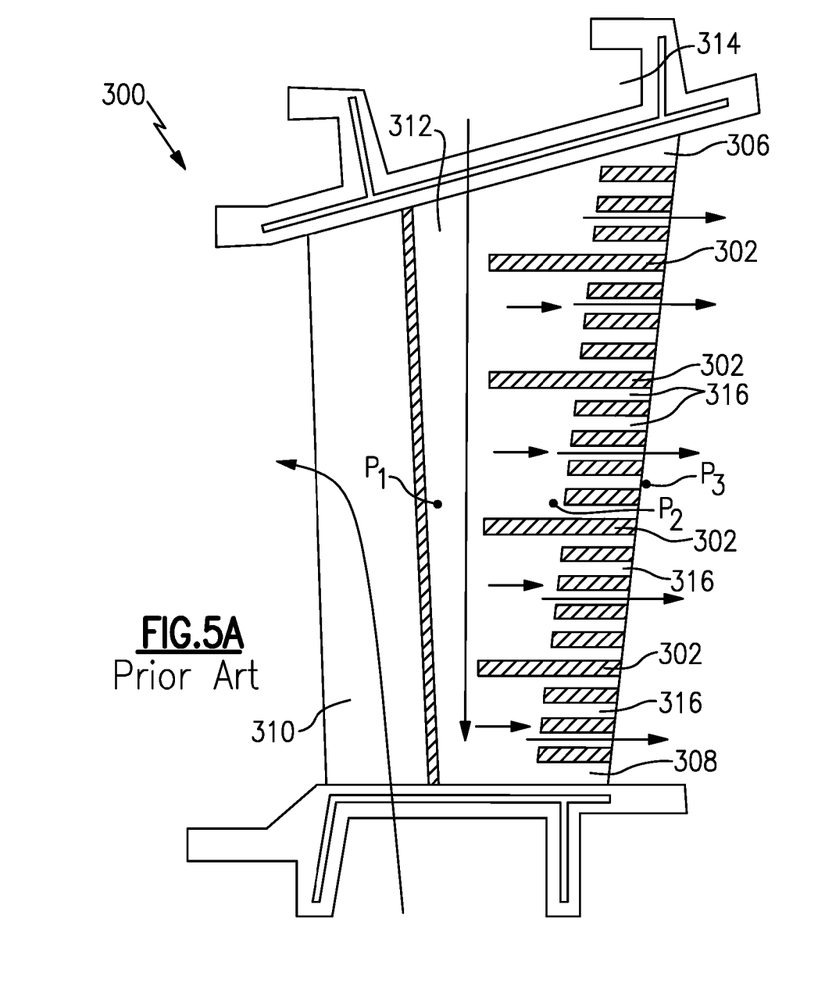
FIG. 5A is a schematic view of a vane incorporating a pedestal configuration from the prior art.
Figure 5B:
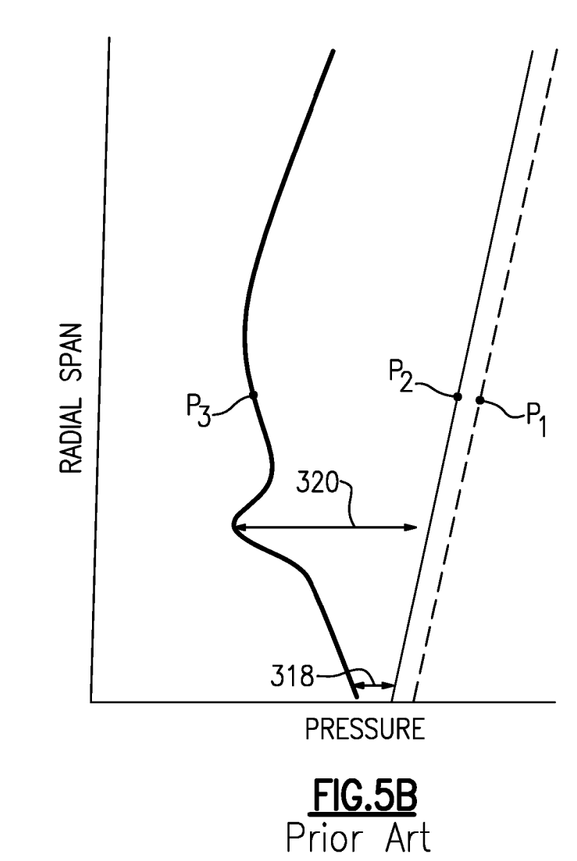
FIG. 5B is a graph representing radial span versus pressure for the vane of FIG. 5A.

In another known configuration shown in FIGS. 5A-5B, a vane 300 includes axial ribs 302 that are radially spaced apart from each other in a direction that extends from a radially outer end 306 of the vane 300 to a radially inner end 308 of the vane 300. Leading edge flow is provided through a first internal cavity 310 as described above. Flow enters the second internal cavity 312 from a vane outer diameter cavity 314, flows around the axial ribs 302 and exits the vane body via trailing edge slots 316.

The second internal cavity 312 has a supply pressure P1. Frictional loses cause this upstream supply pressure P1 to reduce to a downstream supply pressure P2 as flow travels through the cavity 312. The axial ribs 302 prevent radial flow migration so the downstream supply pressure P2 does not rebalance radially. The flow exits trailing edge slots 316 at an exit pressure P3. The minimum trailing edge slot area is determined by manufacturing requirements for the casting process as discussed above. The flow is determined by the BFM across the slots 316 and by the trailing edge slot area. BFMs that are higher than the minimum requirements result in excess flow.

FIG. 5B shows the radial span versus pressure for the axial rib configuration shown in FIG. 5A. The upstream supply pressure P1 is fixed along the radial span. In this configuration, the downstream supply pressure P2, which is slightly less than P1 due to frictional losses, mimics the upstream supply pressure P1. The exit pressure P3 is fixed and is determined by the external shape of the airfoil body and slot size/area required for casting. The lowest BFM (see 318) must meet the minimum requirement, setting the downstream supply pressure P2 and resultant flow. As indicated at 320, the BFM is higher than the minimum requirement which results in excess flow at this radial span location.

Thus, neither the configuration shown in FIGS. 4A-4B nor the configuration shown in FIGS. 5A-5B provide a desired configuration where flow can be minimized but still meet BFM requirements. Further, neither configuration allows flow to be tailored along the trailing edge. The subject invention provides for tailored flow, maintains the desired BFM pressure requirements and meets the cooling flow targets, as well as meeting temperature requirements.

As shown in FIG. 3A, the airfoil body 84 extends from a radially inner end 120 to a radially outer end 122 to define the radial direction. In one example, a radial rib 124 extends from the radially outer end 122 of the body 84 to the radially inner end 120. Leading edge flow is provided through a first internal cavity 104 as described above. Flow enters the second internal cavity 106 from a vane outer diameter cavity 92 and flows into a third internal area 126 adjacent to the trailing edge 102 via the pressure regulating features 118. The third internal area 126 is subdivided into a plurality of individual cavities 116 by the axial ribs 114 which are spaced apart from each other from the radially outer end 122 to the radially inner end 120. Each individual, discrete cavity 116 includes at least one pressure regulating feature 118 at an entrance to the cavity 116. This will be discussed in greater detail below.

The second internal cavity 106 has a supply pressure P1. Frictional loses cause this upstream supply pressure P1 to reduce as flow travels through the cavity 106. The third internal area 126 has a downstream supply pressure P2. The pressure regulating features 118 reduce the downstream supply pressure P2 to the minimum BFM requirement at all radial span locations.

The flow exits trailing edge slots 110 at an exit pressure P3. The minimum trailing edge slot area is determined by manufacturing requirements for the casting process as discussed above. The axial ribs 114 prevent radial flow migration so that the downstream supply pressure P2 does not rebalance radially.

Figure 3B:
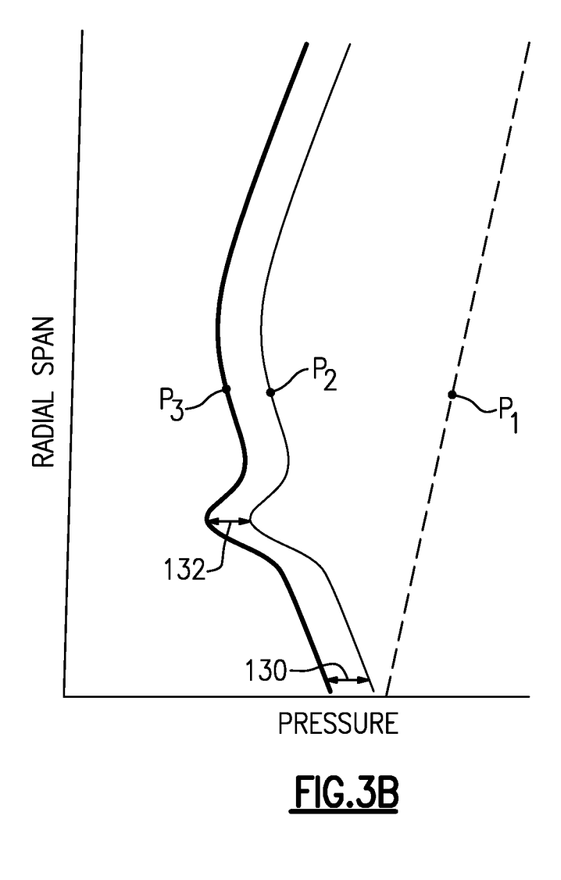
FIG. 3B is a graph representing radial span versus pressure for the vane of FIG. 3A.

FIG. 3B shows the radial span versus pressure for the axial rib and pressure regulating feature configuration shown in FIG. 3A. The upstream supply pressure P1 is fixed along the radial span. The exit pressure P3 is also fixed and is determined by the external shape of the airfoil body. The downstream supply pressure P2 is less than P1 due to frictional losses but mimics the exit pressure P3. This is beneficial as the delta pressure between P2 and P3 is minimized along the entire radial span. The lowest BFM (see 130) must meet the minimum requirement, setting the downstream supply pressure P2 and resultant flow. As indicated at 132, the minimum BFM is met at all locations along the radial span. Thus, the flow, pressure, and temperature requirements are all met while still being tailored as needed.

Figure 6:
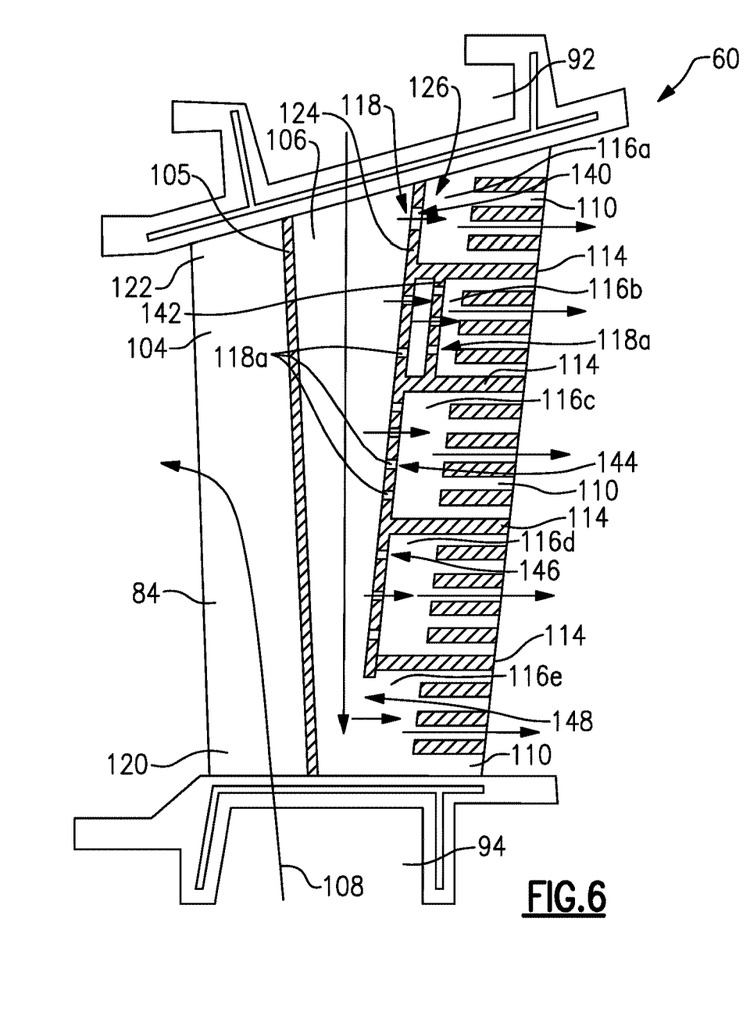
FIG. 6 is a schematic view of a vane from FIG. 2 incorporating one example of the subject invention.
Figure 7:
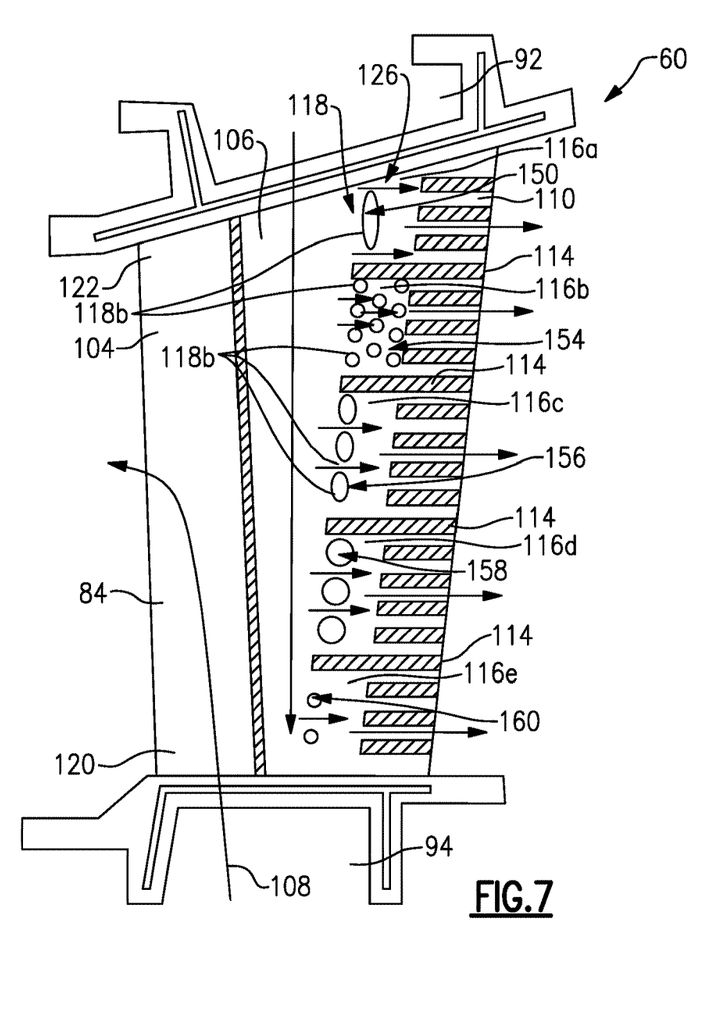
FIG. 7 is a schematic view of a vane from FIG. 2 incorporating another example of the subject invention.

The pressure regulating features 118 can take various forms and can be configured in various combinations and patterns dependent upon desired specifications. FIGS. 6-7 show examples of different types and combinations of pressure regulating features. FIG. 6 shows an example using crossover holes, while FIG. 7 shows an example using pedestals, however, pedestals and crossover holes could also be used in combination with each other.

In the example configuration of FIG. 6, the third internal area 126 is divided into at least five individual cavities 116a-e by four axial ribs 114. The radial wall 124 extends from the radial outer end 122 and stops short of the radially inner end 120 such that four cavities 116 have a fore wall provided by the radial wall 124, while the remaining fifth cavity has an open flow path from the second internal cavity 106 to the trailing edge slots 110. Optionally, the radial wall 124 could extend all the way to the radial inner end 120 or could leave another cavity 116 open to the second internal cavity 106.

In this example, the pressure regulating features 118 comprise a plurality of crossover holes 118a that are formed in the radial wall 124 which defines the entrance to each cavity 116. The holes 118a form flow inputs through the radial wall 124 and into the cavity 116. One hole 118a could be used for each entrance, multiple holes 118a could be used for each entrance, or a combination of one hole 118a and multiple holes 118a could be used along the radial span. The holes 118a can also take various shapes and forms.

For example, FIG. 6 shows that the first cavity 116a includes a single oblong hole 140 at the entrance. The second cavity 116b includes multiple holes 118a in combination with a second radial wall 142 that is spaced axially downstream from the radial wall 124. The second radial wall 142 can also include one or more holes 118a. Thus, the second cavity 116 is divided into two sub-cavities. The third cavity 116c includes multiple oblong holes 144. The fourth cavity 116d includes multiple round holes 146. The fifth cavity 116e is wide open (see 148) to the second internal cavity 106. FIG. 6 is merely one example of a set of pressure regulating features 118, it should be understood that the pressure regulating features 118 could be rearranged and/or or used in other combinations to meet desired requirements.

FIG. 7 shows an example where the pressure regulating feature 118 comprises a plurality of pedestals 118b. The third internal area 126 is divided into at least five individual cavities 116a-e by four axial ribs 114. The pedestals 118b essentially form a radial wall portion as the pedestals are generally aligned with each other in a radial direction extending from the radial outer end 122 to the radially inner end 120. The pedestals 118b are thus positioned at the entrance to each cavity 116, and the spaces between the pedestals 118b form flow inputs into each respective cavity 116. One pedestal 118b could be used for each entrance, multiple pedestals 118b could be used for each entrance, or a combination of one pedestal 118b and multiple pedestals 118b could be used. The pedestals 118b can also take various shapes and forms.

For example, FIG. 7 shows that the first cavity 116a includes a single oblong pedestal 150 at the entrance. The second cavity 116b includes multiple pedestals 118b in combination with a second set of pedestals 154 that is spaced axially downstream from the pedestals 118b. Thus, the second cavity 116 is divided into two sub-cavities by the two sets of pedestals 118b, 154. The third cavity 116c includes multiple oblong pedestals 156. The fourth cavity 116d includes multiple large and round pedestals 158. The fifth cavity 116e includes multiple small and round pedestals 160. FIG. 7 is merely one example of a set of pressure regulating features 118, it should be understood that the pressure regulating features 118 could be rearranged and/or or used in other combinations to meet desired requirements.

The separation of the third internal area 126 adjacent to the trailing edge 102 into separate cavities 116 allows the pressure inside each cavity 116 to be tailored such that each trailing edge slot 110 meets minimum BFM requirements. Tailoring of the downstream supply pressure P2 is accomplished by the use of crossover holes or pedestals with various shapes and sizes in combination with the axial ribs 114 to meet design requirements.

Figure 8A:
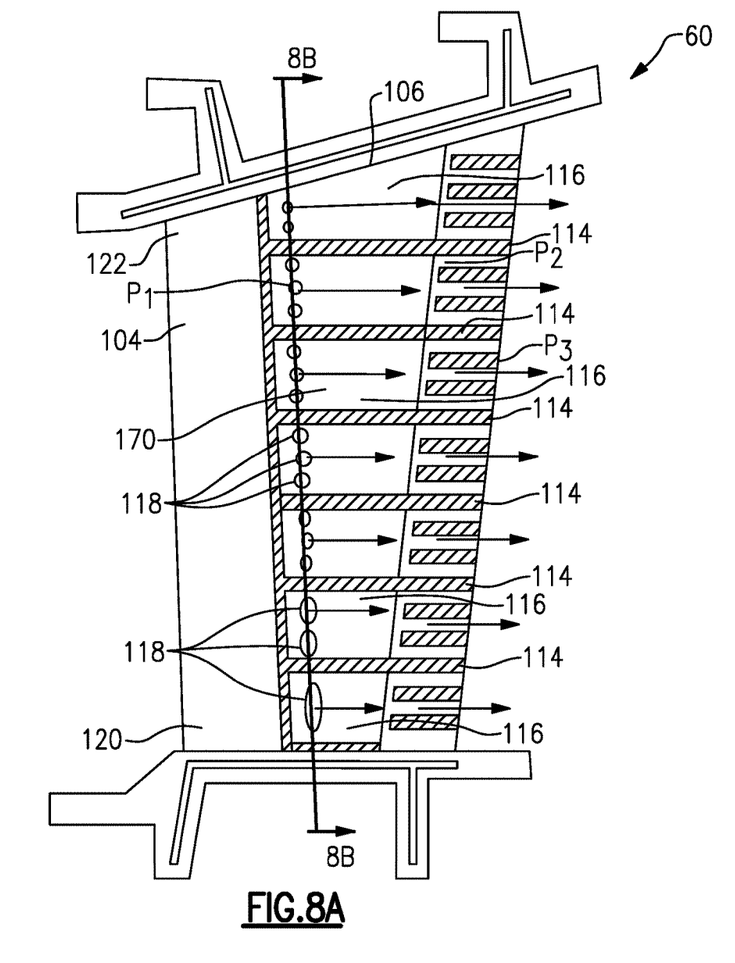
FIG. 8A is a schematic view of a vane from FIG. 2 incorporating another example of the subject invention.
Figure 8B:
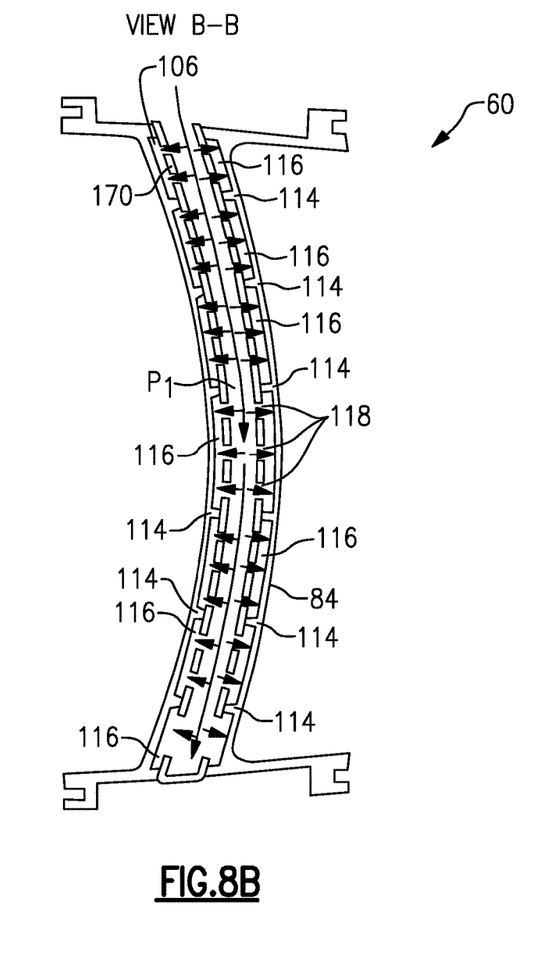
FIG. 8B is a section view as indicated in FIG. 8A.

FIG. 8A-8B shows an example where the pressure regulating features 118 are formed in a baffle 170. In one example, the baffle 170 comprises a U-shaped structure that is positioned within the second internal cavity 106. In the example shown, the U-shaped structure is closed at the radial inner end 120 of the body 82; however, a reverse configuration could also be used. As shown in FIG. 8B, the ribs 114 are positioned on opposing sides of the baffle 170 and do not extend through the baffle. Optionally, one or more ribs 114 could extend through the baffle 170 to meet specified requirements.

The ribs 114 separate the internal area 126 adjacent to the trailing edge 102 into the individual cavities 116. The pressure regulating features 118 comprise holes that are formed in walls of the baffle 170. The holes can be round, oblong, etc. and can vary in size. One hole can be associated with the entrance to each cavity 116 or multiple holes can be associated with the entrance to each cavity 116. The holes regulate the downstream supply pressure P2 to mimic the exit pressure P3 from the trailing edge slots 110 in a manner as described above.

By separating the internal area adjacent to the trailing edge into separate cavities, the pressure inside each cavity can be tailored to manage the supply pressure to the trailing edge slots such that each trailing edge slot has the minimum backflow margin, thereby reducing the cooling flow levels. Once the cavities are separated by axial ribs, the pressure can be tailored by the use of crossover holes or pedestals with various shapes and sizes. In prior art crossover and pedestal designs, the cooling flow was allowed to communicate radially and balance the supply pressure to a relatively constant value while in prior art axial rib designs, the supply pressure to the trailing edge slots was not regulated. Thus, the subject invention offers several advantages over prior designs. Further, while the subject invention is shown in the example of a turbine vane 60, the rib and pressure regulating feature combination could be used in other airfoil structures such as for blades 62, 64 or BOAS 76 (FIG. 2).

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   a body having a leading edge extending to a trailing edge, and extending from a radially inner end to a radially outer end to define a radial span;
   a first internal channel formed within the body adjacent the leading edge;
   a second internal channel formed within the body downstream of the first internal channel to provide an upstream supply pressure;
   a third internal channel formed within the body adjacent the trailing edge and that receives the upstream supply pressure and provides a downstream supply pressure;
   a radial wall that separates the first internal channel from the second internal channel;
   a plurality of axial ribs that separate the third internal channel into a plurality of individual cavities;
   at least one pressure regulating feature located at an entrance to at least one individual cavity to control the downstream supply pressure to the trailing edge; and
   a plurality of exits formed in the trailing edge that communicate with an exit pressure, and wherein an at least one axial rib and pressure regulating features cooperate with each other such that the downstream supply pressure mimics the exit pressure along the radial span.

2. The gas turbine engine component according to claim 1 wherein the at least one pressure regulating feature comprises a plurality of pressure regulating features.

3. The gas turbine engine component according to claim 1 wherein the at least one pressure regulating feature comprises one or more crossover holes.

4. The gas turbine engine component according to claim 1 wherein the at least one pressure regulating feature comprises one or more pedestals.

5. The gas turbine engine component according to claim 1 wherein the plurality of axial ribs are radially spaced apart from each other along the trailing edge to form the plurality of individual cavities.

6. The gas turbine engine component according to claim 5 including a second radial wall that forms a fore wall of at least one of the individual cavities.

7. The gas turbine engine component according to claim 6 wherein the at least one pressure regulating feature is formed in the second radial wall.

8. The gas turbine engine component according to claim 7 wherein each cavity with the second radial wall includes a plurality of pressure regulating features in the second radial wall.

9. The gas turbine engine component according to claim 8 wherein the pressure regulating features comprise any combination of round and/or oblong holes.

10. The gas turbine engine component according to claim 5 including a second radial wall that connects the plurality of axial ribs to each other.

11. The gas turbine engine component according to claim 5 including a plurality of pedestals spaced apart from each other along the radial span to form the entrance to the individual cavities and to provide the pressure regulating features.

12. The gas turbine engine component according to claim 11 wherein the pressure regulating features comprise any combination of round and/or oblong pedestals.

13. The gas turbine engine component according to claim 11 including a second set of pedestals positioned in at least one of the individual cavities downstream of the plurality of pedestals, and wherein the second set of pedestals cooperates with the plurality of pedestals to further define the pressure regulating features.

14. The gas turbine engine component according to claim 1 wherein the pressure regulating features are formed in a baffle positioned within the second internal channel.

15. A gas turbine engine component comprising:
a body having a leading edge extending to a trailing edge, and extending from a radially inner end to a radially outer end to define a radial span;
a first internal channel formed within the body to provide an upstream supply pressure;
a second internal channel formed within the body that receives the upstream supply pressure and provides a downstream supply pressure;
a plurality of axial ribs that separate an internal area adjacent to the trailing edge into a plurality of individual cavities;
at least one pressure regulating feature located at an entrance to at least one individual cavity to control the downstream supply pressure to the trailing edge;
a plurality of exits formed in the trailing edge that communicate with an exit pressure, and wherein the at least one axial rib and pressure regulating features cooperate with each other such that the downstream supply pressure mimics the exit pressure along the radial span;
a radial wall that forms a fore wall of at least one of the individual cavities, wherein the at least one pressure regulating feature is formed in the radial wall; and
a second radial wall positioned in at least one of the individual cavities downstream of the radial wall, and wherein the second radial wall includes at least one pressure regulating feature.

16. A gas turbine engine comprising:
a compressor section defining an engine center axis;
a combustor section downstream of the compressor section; and
a turbine section downstream of the combustor section, wherein the turbine section includes a turbine component having
a leading edge extending to a trailing edge, and extending from a radially inner end to a radially outer end to define a radial span,
a first internal channel formed within the turbine component adjacent the leading edge;
a second internal channel formed within the turbine component downstream of the second internal channel to provide an upstream supply pressure,
a third internal channel formed within the turbine component adjacent to the trailing edge and that receives the upstream supply pressure and provides a downstream supply pressure,
a radial wall that separates the first internal channel from the second internal channel,
a plurality of axial ribs that separate the third internal channel into a plurality of individual cavities,
at least one pressure regulating feature located at an entrance to at least one individual cavity to control the downstream supply pressure to the trailing edge, and
a plurality of exits formed in the trailing edge that communicate with an exit pressure, and wherein an at least one axial rib and pressure regulating features cooperate with each other such that the downstream supply pressure mimics the exit pressure along the radial span.

17. The gas turbine engine according to claim 16 wherein the at least one pressure regulating feature comprises one or more crossover holes and/or one or more pedestals.

18. The gas turbine engine according to claim 16 including a second radial wall that forms a fore wall of at least one of the individual cavities, and wherein the at least one pressure regulating feature is formed in the second radial wall.

19. The gas turbine engine according to claim 18 wherein the second radial wall extends in a radial direction to form the fore wall of a plurality of individual cavities, and wherein at least one pressure regulating feature is formed in the second radial wall for each individual cavity that includes the fore wall.

20. A gas turbine engine comprising;
a compressor section defining an engine center axis;
a combustor section downstream of the compressor section; and
a turbine section downstream of the combustor section, wherein the turbine section includes a turbine component having
a leading edge extending to a trailing edge, and extending from a radially inner end to a radially outer end to define a radial span, a first internal channel formed within the turbine component to provide an upstream supply pressure, second internal channel formed within the turbine component that receives the upstream supply pressure and provides a downstream supply pressure, at least one axial rib that separates an internal area adjacent to the trailing edge into a plurality of individual cavities, wherein the at least one axial rib is a plurality of axial ribs that are radially spaced apart from each other along the trailing edge, at least one pressure regulating feature located at an entrance to at least one individual cavity to control the downstream supply pressure to the trailing edge, and a plurality of exits formed in the trailing edge that communicate with and exit pressure, and wherein the at least one axial rib and pressure regulating features cooperate with each other such that the downstream supply pressure mimics the exit pressure along the radial span.

* * * * *